Figures 1, 2:
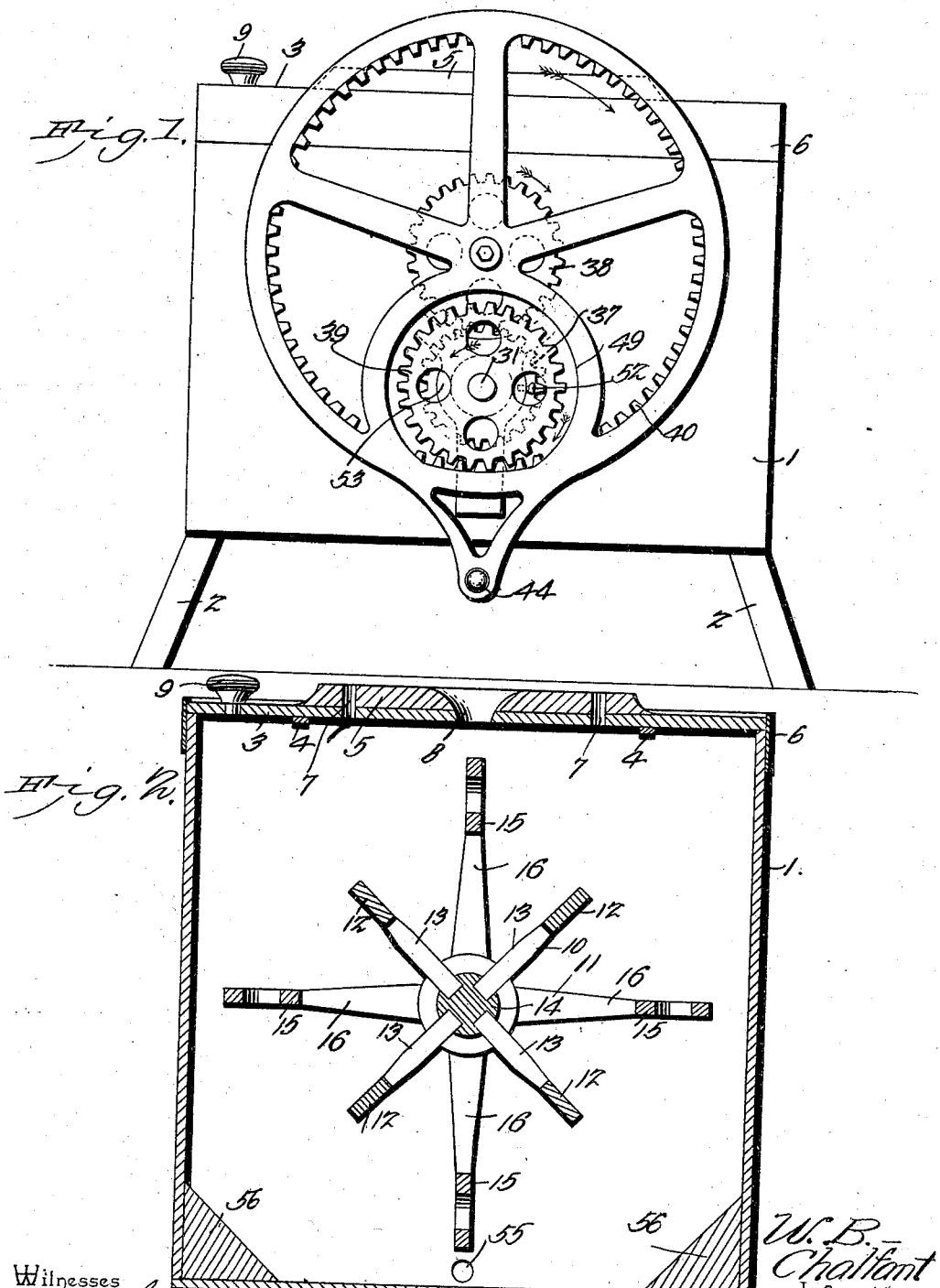

No. 709,137. Patented Sept. 16, 1902.
W. B. CHALFANT.
CENTRIFUGAL CHURN.
(Application filed May 6, 1902.)

(No Model.) 2 Sheets—Sheet 1.

Witnesses
E. K. Stewart
N. F. Riley

W. B. Chalfant
Inventor
by C. A. Snow & Co
Attorneys

No. 709,137. Patented Sept. 16, 1902.
W. B. CHALFANT.
CENTRIFUGAL CHURN.
(Application filed May 6, 1902.)
(No Model.) 2 Sheets—Sheet 2.
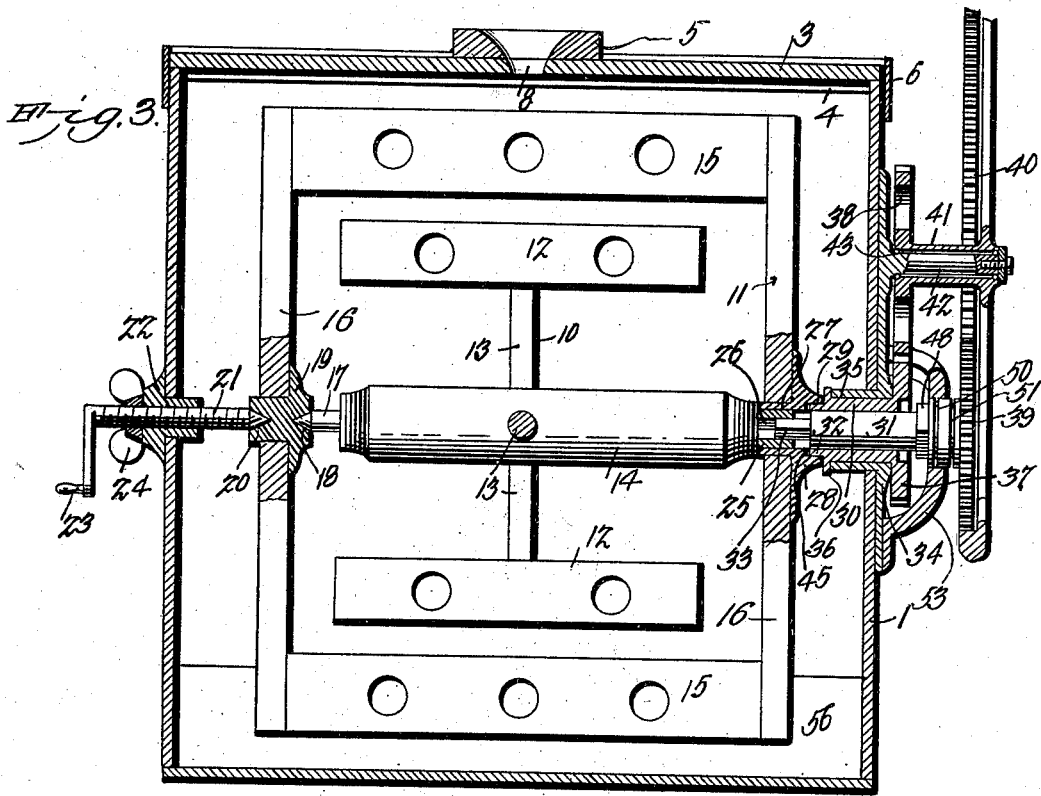
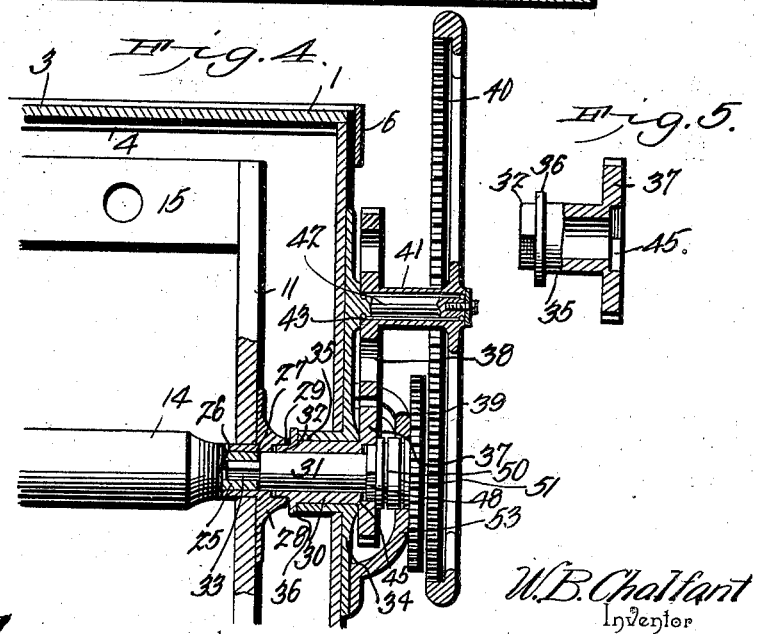
Witnesses
W. B. Chalfant
Inventor
by C. A. Snow & Co.
Attorneys

UNITED STATES PATENT OFFICE.

WALTER B. CHALFANT, OF BRAZNELL, PENNSYLVANIA.

CENTRIFUGAL CHURN.

SPECIFICATION forming part of Letters Patent No. 709,137, dated September 16, 1902.

Application filed May 6, 1902. Serial No. 106,187. (No model.)

*To all whom it may concern:*

Be it known that I, WALTER B. CHALFANT, a citizen of the United States, residing at Braznell, in the county of Fayette and State of Pennsylvania, have invented a new and useful Centrifugal Churn, of which the following is a specification.

The invention relates to improvements in churns.

The object of the present invention is to improve the construction of churns and to provide a simple, inexpensive, and efficient one having a pair of rotary dashers and adapted to be readily arranged for reversely rotating the dashers for agitating the milk or cream to enable butter to be rapidly produced and capable also of being readily arranged for rotation in the same direction for gathering the butter.

A further object of the invention is to enable the dashers to be readily removed after the operation of churning has been completed, to permit the churn to be easily cleaned, and to provide a churn-body which will effectually prevent the milk or cream from splashing out during the operation of churning and which at the same time will permit the escape of gases and enable water to be supplied without interfering with the operation of the churn.

The invention consists in the construction and novel combination and arrangement of parts hereinafter fully described, illustrated in the accompanying drawings, and pointed out in the claims hereto appended.

In the drawings, Figure 1 is a side elevation of a churn constructed in accordance with this invention. Fig. 2 is a vertical sectional view of the same. Fig. 3 is a similar view taken at right angles to Fig. 2, the parts being arranged for reversely rotating the dashers. Fig. 4 is a similar view of one side of the churn, the parts being arranged for rotating the dashers in the same direction. Fig. 5 is a detail view of the inner pinion.

Like numerals of reference designate corresponding parts in all the figures of the drawings.

1 designates a churn-body rectangular in cross-section, supported by suitable legs 2 and provided with a cover 3, reinforced at the lower face by cleats 4 and provided with an exterior cleat 5, adapted to serve as a handle for removing the cover from the churn-body. The body of the churn is provided with an upwardly-extending flange 6, extending entirely around it and preferably formed by strips or pieces secured to the exterior of the sides of the churn-body, as shown. These strips extend above the cover and effectually prevent the milk or cream from splashing out of the churn-body. The cover is provided at opposite sides of the center with perforations 7 for the escape of gases, and an outwardly-flared opening 8 is formed in the cover and the cleat 5 to enable water to be readily applied to the churn during the operation of churning. The cover is also provided with a knob or handle 9, located at one side of the body and adapted to permit the cover to be readily raised by the operator to afford a view of the interior of the churn without entirely removing the cover.

Within the churn-body are arranged inner and outer dashers 10 and 11, adapted to be rotated in opposite directions to thoroughly and rapidly agitate the contents of the churn-body to effect a rapid production of butter and capable also of being rotated in the same direction to gather the butter. The inner dasher is composed of four blades 12, supported by centrally-arranged diametrically-disposed arms 13, extending from a horizontal shaft 14, as clearly shown in Fig. 3 of the drawings. The outer dasher 11, which receives the inner dasher, is composed of blades 15, supported by bars or arms 16, centrally connected and arranged as shown in Fig. 2. The blades 12 and 15 are provided at intervals with openings, and when the dashers are rotated in opposite directions the contents of the churn-body are thoroughly agitated. The inner dasher is provided at one end of the horizontal shaft 14 with a journal 17, having a conical outer end and arranged in a conical bearing-recess 18 of a bearing-plate 19, and the latter is provided with an outer bearing-recess 20 for the reception of a tapered or conical inner end of a screw 21, which forms an adjustable journal or bearing and which enables the wear of the parts to be readily taken up. The screw, which is also adapted to permit the dashers to be readily detached, is mounted in a threaded opening of the plate or bracket 22 and is provided at its outer end with a crank-handle 23 or other suitable means for rotating it, and it is secured against accidental movement by a jam-nut 24, arranged on the outer portion of the screw and engaging the outer face of the plate 22, as clearly shown in Fig. 3 of the drawings. The other end of the shaft 14 is provided with a journal 25, having a socket 26 and arranged in a bearing-opening 27 of a bearing-plate 28, mounted on the adjacent side of the outer dasher and provided with an exterior socket 29 for an outer tubular shaft 30. The outer tubular shaft 30, which is provided with a round bore or opening for the reception of an inner shaft 31, has a polygonal inner end 32 to fit the socket 29, whereby the outer dasher is rigidly connected with the outer tubular shaft. The inner shaft 31 is provided at its inner end with a polygonal portion 33, which is reduced to fit the socket 26 and which is adapted to slide inward and outward for a purpose hereinafter described. The outer tubular shaft 30 is arranged in a sectional bearing 34 and is provided at the inner end of a tubular portion 35 thereof with a flange 36, interposed between the tubular portion 35 and the bearing-plate 28, the outer tubular shaft and the bearing 34 being assembled before the parts are applied to the side of the churn-body. The outer tubular shaft is fixed to an inner pinion 37, which meshes with an inner gear-wheel 38, and the inner shaft 31 is fixed to an outer pinion 39, which meshes with an outer internal gear 40. The outer internal gear 40 is connected with the inner gear-wheel 38 by a sleeve 41, arranged on a stub-shaft 42 of the bearing-plate 34 and retained thereon by means of a suitable fastening device at the outer end of the stub-shaft. The stub-shaft is designed to be provided at intervals with grooves forming races for antifriction-balls 43, which enable the gear-wheels to rotate frictionlessly. The internal gear-wheel 40 and the gear-wheel 38 are rotated in the same direction by means of a crank-handle 44, and the gear-wheel 38 meshes with the inner pinion and rotates the outer dasher in one direction, while the internal gear-wheel meshes with the outer pinion and rotates the inner dasher in the opposite direction. The inner shaft is slidably mounted in the outer tubular shaft to carry the outer pinion into and out of mesh with the internal gear-wheel and to carry the outer portion of the inner shaft into and out of engagement with the inner pinion 37, which is provided with a socket or recess 45 for the reception of a polygonal outer portion 48 of the inner shaft. When the polygonal portion 48 is in engagement with the inner pinion, the outer pinion is out of mesh with the internal gear-wheel and the inner and outer shafts are interlocked, whereby both dashers will be operated in the same direction by the pinion 37 and the gear-wheel 38. The crank-handle 44 extends beyond the periphery of the internal gear-wheel and is adapted to increase the weight of one side of the same sufficiently to cause it to normally hang at the bottom, as shown in Fig. 1, to arrange an enlarged opening 49 at the bottom opposite the outer pinion. The opening 49 is formed by two of the arms or spokes of the internal gear-wheel and is of a size to permit the outer pinion to pass readily through it, whereby the outer pinion and the inner shaft may be readily assembled and removed without detaching the internal gear-wheel. The outer portion of the inner shaft is provided with a pair of annular grooves 50 and 51, adapted to be engaged by a set-screw 52 to retain the inner shaft in either of its positions. The set-screw 52 is mounted in a suitable support 53, consisting of a bearing-bracket mounted on the bearing plate or bracket 34. The support 53 may be provided with a ring encircling the outer portion of the inner shaft and connected with the bearing plate or bracket 34 by arms, as clearly shown in Figs. 3 and 4. By loosening the set-screw the inner shaft and the pinion 39 may be readily moved inward and outward for arranging the parts to rotate the dashers in the same direction or in opposite directions.

The churn-body is provided with a suitable opening 55 to enable the liquid contents to be readily drawn off, and the churn-body is provided at its bottom at opposite sides with strips or bars 56, triangular in cross-section and adapted to fill the adjacent angles or corners, as clearly shown in Fig. 2.

The inner and outer dashers are detachably connected with the inner and outer shafts, and they are retained in such engagement by the screw, which may be readily adjusted to permit the dashers to be removed from and replaced in the churn-body.

What I claim is—

1. A churn comprising inner and outer dashers, inner and outer shafts connected with the dashers, the inner shaft being slidable and provided with means for engaging the outer shaft, whereby it is interlocked with the latter when it is moved inward, and gearing connected with the shafts for reversely rotating the dashers, said gearing having a gear-wheel carried by the inner shaft, and adapted to be thrown out of mesh by the inward movement of the same to permit the dashers to be rotated in the same direction when the inner and outer shafts are interlocked, substantially as described.

2. A churn comprising a pair of dashers, shafts connected with the dashers, one of the shafts being slidable in the other and provided with means for interlocking it with the same, and gearing connected with the shafts for rotating the same in opposite directions, said gearing having an element carried by the slidable shaft and arranged to be thrown out of mesh by the same, whereby both dashers will be rotated in the same direction when the shafts are interlocked, substantially as described.

3. A churn comprising inner and outer dashers having sockets, the inner dasher being journaled on the outer dasher, an outer tubular shaft engaging the socket of the outer dasher, an inner shaft rotating within the outer shaft and provided at its inner end with means for engaging the socket of the inner dasher, said inner shaft being provided at its outer end with means for interlocking it with the outer shaft and being slidable to carry it into and out of such engagement, inner and outer pinions mounted on the said shafts, a gear-wheel meshing with the inner pinion, and an internal gear-wheel connected with the said gear-wheel and meshing with the outer pinion, the latter being movable with the inner shaft and adapted to be carried out of mesh by the inward movement of the same, substantially as described.

4. A churn comprising inner and outer dashers having sockets, an outer tubular shaft provided at its inner end with means for engaging the socket of the outer dasher, an inner pinion mounted on the outer shaft and having a recess or socket, an inner slidable shaft provided at its inner end with a reduced portion engaging the socket of the inner dasher, said inner shaft being also provided at its outer end with a portion for engaging the recess or socket of the inner pinion, an inner gear-wheel meshing with the inner pinion, an outer internal gear-wheel connected with the inner gear-wheel, and an outer pinion carried by the inner shaft and meshing with the internal gear-wheel and adapted to be carried out of engagement with the same by the inward movement of the said inner shaft, substantially as described.

5. A churn comprising inner and outer dashers, inner and outer shafts interlocked with the dashers, an inner pinion mounted on the outer shaft, means carried by the inner shaft for engaging the inner pinion to interlock the inner shaft with the outer shaft, an outer pinion carried by the inner shaft, an inner gear-wheel meshing with the inner pinion, an outer internal gear-wheel connected with the said gear-wheel and meshing with the outer pinion, a support receiving the outer portion of the inner shaft, and means carried by the support for engaging the inner shaft to secure the same in either of its positions, substantially as described.

6. A churn comprising inner and outer dashers, inner and outer shafts secured to the dashers, the inner shaft being extended beyond the outer shaft and provided with grooves, an inner pinion mounted on the outer shaft, means carried by the inner shaft for interlocking it with the outer shaft, gearing connecting the shafts and having an element carried by the inner shaft, and a fastening device mounted on a suitable support and arranged to engage the grooves to retain the inner shaft in either position, substantially as described.

7. A churn comprising an outer dasher provided at one side with a bearing-plate having inner and outer bearing-recesses, said outer dasher being also provided at its other side with a socket having a bearing, an inner dasher having a journal arranged in the inner recess of the bearing-plate, said inner dasher being also provided with a socket journaled in the bearing of the socket of the outer dasher, an adjusting-screw engaging the outer recess of the bearing-plate and supporting the dashers at one side of the churn, inner and outer shafts located at the outside of the churn and detachably interlocked with the sockets of the dashers, and gearing connected with the inner and outer shafts and adapted to rotate the dashers either in the same direction or in opposite directions, substantially as described.

In testimony that I claim the foregoing as my own I have hereto affixed my signature in the presence of two witnesses.

WALTER B. CHALFANT.

Witnesses:
T. D. HANN,
E. T. BRASHEAR.